United States Patent Office 2,807,976
Patented Oct. 1, 1957

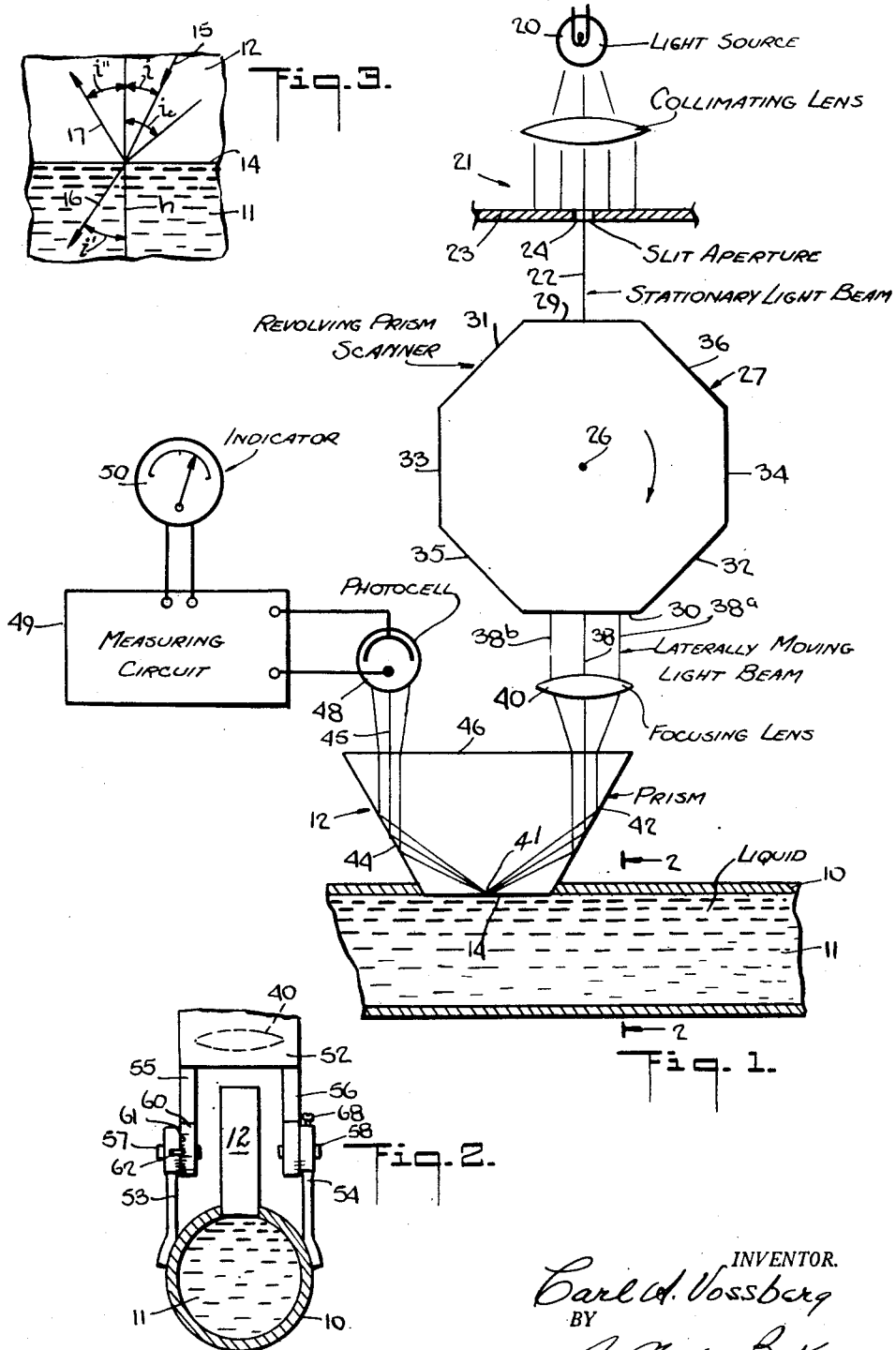

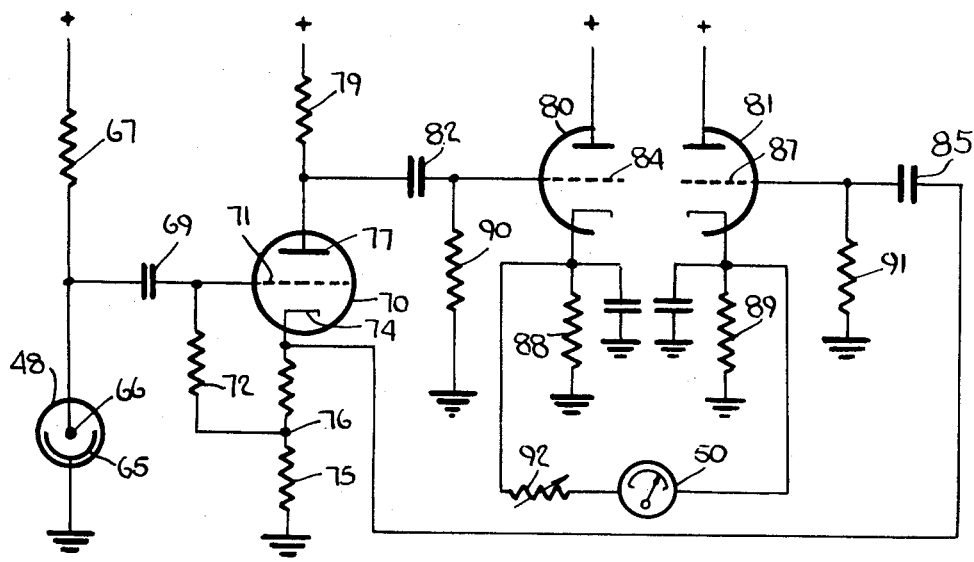
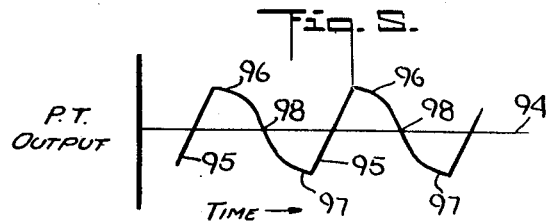
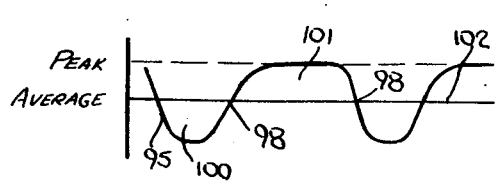
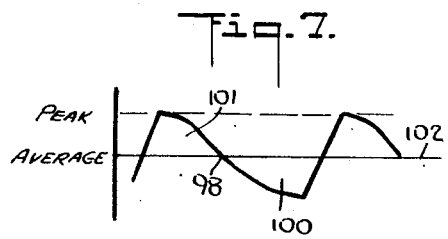

2,807,976

REFRACTOMETER

Carl A. Vossberg, Umatilla, Fla., assignor to The Electron-Machine Corporation, Umatilla, Fla., a corporation of Florida Application October 11, 1955, Serial No. 539,907

13 Claims. (Cl. 88—14)

The present invention relates to a refractometer of the continuously indicating type. The refractometer is specifically described in connection with liquid flow lines of processing industries although its adaptability for use in other environments will be evident.

This refractometer is of the type which makes regularly repeated measurements at a repetition rate sufficiently high to provide a substantially continuous indication of the index of refraction of a fluid, effectively at every instant, thus providing an indication which may be used for automatic control purposes, if desired.

In a preferred embodiment of the invention, the apparatus comprises a measurement prism which is mounted directly in the wall of a flow line, a vat, or other fluid container. The prism includes a plane interface surface in direct contact with the moving fluid in the flow line. Preferably this plane surface is set effectively flush with the wall of the flow line to provide a minimum of interference with liquid flow and to facilitate the frequent cleaning operations which are essential in those industries such as fruit juice production or the processing of other liquids where a high standard of cleanliness must be maintained at all times.

As a result of this novel form of construction, it is not necessary to divert a continuously flowing measurement specimen from the liquid in the flow line and to pass such specimen through the measuring apparatus. Apparatus of this sampling character requires the usual frequent cleaning not only of the main flow line, but also of the measurement apparatus in order that the essential high degree of cleanliness may be maintained at all times.

The present refractometer comprises an optical scanner which directs a narrow beam of light into the measurement prism, and photoelectric measuring means which responds to the phasing of each change in the amount of reflected light returned from the prism as the scanning beam passes through the critical angle of the prism-liquid interface, the scanner and measurement instrumentalities being disposed in proximity to the flow line. The beam of light directed into the measurement prism by the scanner impinges at a continuously varying angle of incidence against the reflecting face of the prism which is in direct contact with the liquid. The range of angular variation is arranged to include the critical angle of incidence for the nominal value of the index of refraction of the particular liquid. The expression "critical angle" is well understood in the art and is discussed in greater detail hereinafter.

As the angle of the beam passes through the critical angle there will be a change from total to partial reflection, or vice versa, depending upon whether the angle of incidence is increasing or decreasing in magnitude. This change is sufficiently sharp and abrupt to permit its phasing or time of occurrence to be utilized photoelectrically without considering the actual intensities of illumination involved. The measurement apparatus therefore detects the particular instant or portion of the scanning cycle where the abrupt change occurs and utilizes this information for purposes of measurement and control.

It is a feature of the invention that a waveshape symmetry discriminator is employed for detecting any deviation of the index of refraction of the fluid from a predetermined nominal value. The system is effectively balanced and changes in the gains of electronic tubes, variations in the light intensity at any portion of the system, and fluctuations in voltage supply will have little effect. By virtue of the concept and mechanism employed in the refractometer of this invention, a device is provided which is of marked simplicity and compactness while nevertheless being of high accuracy and reliability under varying conditions.

Various objects of the invention together with other features and advantages thereof will become apparent upon reading the following specification together with the accompanying drawing forming a part hereof.

The invention will be further understood from the following description and drawings in which:

Figure 1 is a diagrammatic view in sectional elevation illustrating an embodiment of the invention;

Figure 2 is a transverse cross-sectional view taken along the line 2—2 of Figure 1, looking in the direction of the arrows and illustrating adjustment means for increasing the range of measurement of the apparatus;

Figure 3 is an enlarged fragmentary sectional view showing various angles of incidence and refraction for the boundary between a prism face and a liquid of Figure 1;

Figure 4 is an electrical circuit diagram showing a measuring and indicating circuit suitable for use with Figure 1; and Figures 5, 6 and 7 are waveshape diagrams illustrating certain characteristics involved in the operation of the circuit of Figure 4.

Referring to Figure 1, a tubular duct or flow line 10 carries a liquid 11 which may be in a state of continuous flow and of which the index of refraction is to be measured. Instead of flow line 10, the liquid 11 may be confined in a vessel such as a vat or tank. Disposed in the wall of the flow line 10 is a measurement prism designated generally as 12. As shown, the measurement prism 12 is of isosceles trapezoidal shape in longitudinal cross-section, and is rectangular both in plan and in transverse sections.

The measurement prism 12 has a transparent plane, refractive measurement face 14 which is in direct contact with the liquid 11 confined in flow line 10 of which liquid the index of refraction is to be continuously measured. This contact between the liquid 11 and prism 12 is shown on an enlarged scale in Figure 3. A beam of light 15 (Figure 3), traveling within glass prism 12 arrives at the plane refracting face 14 at an angle of incidence $i$ with respect to the perpendicular $h$ which is normal to the plane of measurement face 14. The incident beam 15, provided the angle of incidence $i$ is less than a critical maximum value $i_c'$ (defined hereinafter) will be partially refracted as a beam 16 at angle $i'$ in liquid 11 and partially reflected as beam 17 returning at angle $i''$ within the prism 12 from face 14. The angle of reflection $i''$ is equal to the angle of incidence $i$. The angle of refraction $i'$ will be greater than the angle of incidence $i$ and may be numerically evaluated from the well-known formula for refraction:

$$n \sin i = n' \sin i'$$

where $n$ is the index of refraction of the glass of prism 12 and $n'$ is the index of refraction of the liquid 11 which must be less than $n$.

The value of the critical angle of incidence $i_c$ may be determined from the formula $$i_c = \arcsin \frac{n'}{n}$$

As a numerical example, assume that the prism 12 is formed of flint glass having an index of refraction of 1.618 and that the liquid 11 is normally of such characteristics that it will have an index of refraction of 1.400 which corresponds to 40% on the usual sugar percentage scale.

The critical angle of incidence $i_c$ will be arcsin 1.400/1.618 (arcsin 0.86526), or approximately 60° (59° 54′ 45″).

For the critical angle of incidence $i_c$, the corresponding angle of refraction $i'$ is, as is well understood, 90° so that for angles of incidence $i$ exceeding $i_c$ (60° in the example), there will be total reflection and for angles less than this critical value, there will be only partial reflection and the reflected beam 17 will be diminished in illumination intensity by the presence of refracted beam 16 which consumes a portion of the total light content of incident beam 15.

As described in greater detail below, in accordance with this invention, the angle of incidence $i$ of the incident beam 15 is cyclically caused to vary through the critical angle $i_c$ so that each time that it passes through the critical value $i_c$ there will be an abrupt change in the amount of light in reflected beam 17. The index of refraction of liquid 11 is measured with reference to the particular instant in each cycle at which this abrupt change occurs without regard to its magnitude.

Referring again to Figure 1, a light source 20 cooperates with an optical system designated generally as 21 to produce a stationary thin ribbon of light 22. The optical system 21 is diagrammatically shown as comprising a collimating lens and a plate 23, the plate 23 having an elongated narrow slit aperture 24 formed therein which produces the ribbon-like light beam 22. Any desired optical system for producing such a light beam may be used instead of the particular system shown for purposes of illustration.

The light beam 22 is directed toward the longtiudinal axis 26 of a continuously revolving prism designated generally as 27. The prism 27 is illustratively shown as being of regular octagonal shape when viewed in transverse cross-section. The prism 27 is caused to rotate at constant angular velocity about its longitudinal axis 26 by any desired means such as a small electric motor (not shown). The prism 27 is provided with four regularly angularly spaced diametrically opposed pairs of plane parallel faces 29—30, 31—32, 33—34 and 35—36. In the drawing, the beam 22 is shown entering the center of face 29 and emerging from face 30 as a laterally moving beam 38.

When beam 22 first commenced to fall on face 29, the face 29 was inclined upwardly toward the right at an angle of 22½ degrees so that the emergent ribbon-like beam 38 leaving face 30 initially occupied the position indicated at 38a being parallel to the entering beam 22 but laterally displaced from alignment therewith. The beam 38 will continue to move laterally toward the left, always remaining parallel to the entering beam 22, until it reaches the final position indicated at 38b just as beam 22 is about to discontinue entering prism 27 through face 29 and commence entering prism 27 through the next face 31. At this instant, the emergent beam 38 jumps back abruptly to its initial position at 38a and recommences its controlled leftward movement toward its final position at 38b, this time passing through faces 31 and 32 of prism 27. This action proceeds regularly as the prism 27 revolves, the emergent beam 38 making eight leftward movements for each complete revolution of prism 27 as the beam 22 enters each of the eight faces, 29, 31, 33, 35, 30, 32, 34 and 36 successively in the order named.

The emergent laterally moving beam of light 38 falls on a double convex focusing lens 40 which may be spherical or cylindrical. Upon emerging from the focusing lens 40, the beam of light 38 becomes an angularly moving beam which is focused by lens 40 at a fixed focal line 41 lying on the refractive interface 14 of the prism 12. In order to reach the refractive interface 14, the angularly moving beam is reflected from an inclined reflecting face 42 of prism 14 which may be silvered. The angle of incidence of beam 38 at the focal line 41 will thus vary cyclically and repeatedly with the beam moving in a clockwise direction about focal line 41 as an axis of rotation. Alternatively, the focal line 41 may be located on the reflecting face 42, or some other portion of the prism, so long as the angle of incidence of the beam at the refracting interface varies through the critical angle.

The angle of incidence $i$ of the beam reflected from line 41 will therefore vary throughout a range determined by the dimensioning of the revolving prism 27 and the lens 40. Preferably, this range is so selected that the angle of incidence $i$ of beam 15 (Figure 3) will vary substantially symmetrically with respect to the critical angle $i_c$ when the characteristics of the liquid 11 have the desired predetermined nominal value. Under such conditions, the critical angle $i_c$ lies substantially at the midpoint of each successive scanning cycle and the abrupt change in the intensity of the reflected beam 17 will occur half way through each scanning cycle unless the refractive index of the liquid 11 has changed so that the deviation may be measured and appropriate correction may be made if required.

The reflected beam 17, irrespective of whether it is produced by total reflection or partial reflection, is directed toward an inclined reflecting surface 44 at the left hand side of measurement prism 12. From reflecting surface 44, the moving reflected ray 45 passes upwardly through the top face 46 of prism 12 to a phototube or photocell 48 which is responsive to its intensity.

It is to be understood that the reflecting faces 42 and 44 of prism 12 may be silvered, if desired, and that they may be curved or otherwise shaped to direct the reflected ray 45 to a small linear area of phototube 48. The phototube 48, however, is shown located in close proximity to the prism 12 so that focusing of the reflected ray 45 is not required since it will reach the phototube 48 for all positions of the laterally moving light beam 38.

The phototube 48 is connected to a measurement circuit 49. An indicator 50 of the center-zero type responds to the measuring circuit 49.

In order to change the range of response of the apparatus the entire scanning apparatus comprising light source 20, optical system 21 for producing the ribbon-like beam of light 22, the revolving prism 27 with its driving means, and the lens 40 may be mounted in a housing or enclosure 52 as shown in Figure 2. Brackets 53 and 54 are mounted on opposite sides of flow line 10. The housing 52 is provided with downwardly extending legs 55 and 56 which are connected to the upper ends of brackets 53 and 54 by pivot pins 57 and 58, respectively.

The leg 55 of housing 52 is provided with a circularly enlarged lower end 60 upon which a calibrated protractor scale 61 is suitably marked. An index pointer 62 cooperates with scale 61 to permit the housing 52 to be set at any predetermined angular position by rotation on the pivot pins 57 and 58. A set screw 68 is provided for locking the housing 52 in such position of adjustment. The pivotal axes of pivot pins 57 and 58 are in alignment with each other and with the line of focus 41 of lens 40. As housing 52 is angularly adjusted, the angular range of scanning will be varied so that it may be brought into symmetry with respect to the nominal value of the critical angle at the measurement face 14 of prism 12.

This permits the zero deviation indication of indicator 50 to be adjusted for the predetermined nominal value of the index of refraction of the liquid 11 in flow line 10.

Indicator 50 will thus indicate deviations of the actual index of refraction above and below the predetermined nominal value. The same circuit which extends to indicator 50 may be further extended to corrective control apparatus to bring the index of refraction back to its normal value. Such control apparatus may include valves, heat control devices, or other means suited to the particular controllable factor which causes the variation in the refractive index.

The measuring circuit 49 may take the form shown in Figure 4. The photocell 48 is illustratively shown as having a grounded light-sensitive cathode 65 and an anode 66 energized from a suitable source of anode potential through a coupling resistor 67. The changes in potential at the anode 66 are transmitted through a coupling capacitor 69 to a triode 70 which is connected as a combined amplifier and phase inverter. The light intensity variation signals from phototube 48 are applied to the control grid 71 of triode 70, the grid 71 being maintained at a suitable potential through a biasing resistor 72.

The cathode 74 of triode 70 is returned to ground through a tapped biasing resistor 75 which may be an adjustable potentiometer. Grid 71 is regeneratively returned to a tap point 76 on cathode resistor 75. The anode 77 of triode 70 is connected to the anode supply through a coupling resistor 79.

A pair of triodes 80 and 81, which may be constituted by a twin triode, are shown connected as a pair of peak voltage responsive circuits which operate as a symmetry discriminator. A signal of one polarity is applied from anode 77 of triode 70 through a coupling capacitor 82 to the grid 84 of triode 80. A signal of opposite polarity and opposite in phase is applied from the cathode 74 of triode 70 through another coupling capacitor 85 to the grid 87 of triode 81.

The cathodes of triodes 80 and 81 are returned to ground through capacitor shunted biasing resistors 88 and 89 and their grids 84 and 87 are returned to ground through the usual grid resistors 90 and 91, respectively. The cathodes of triodes 80 and 81 are connected to indicator 50 through an adjustable sensitivity control resistor 92.

During the course of the angular scanning operation, the potential at the anode 66 of phototube 48 will have asymmetrical waveshape as shown in Figure 5 when the index of refraction of liquid 11 is at its predetermined nominal value and a corresponding signal will be applied to triode 70. However, when a change in the index of refraction of liquid 11 occurs, the critical angle will be reached at a different point in the cycle and will produce an asymmetrical waveshape.

In Figure 5, 94 represents the average potential at anode 66. Each sharp rise at 95 represents the beginning of a new scanning cycle as beam 22 first enters the revolving prism 27 through a newly presented face. The angular sweeping action continues within prism 12 with partial reflection of light from measurement surface 14 until the angle of incidence exceeds the critical angle. At this point in the cycle, total reflection commences and the illumination level at phototube 48 is suddenly increased. This increase in illumination is accomplished by a drop in potential at the anode 66 of phototube 48 which is reduced from its upper positive value as indicated at 96 to its lower value at 97 crossing the average line 94 at point 98.

A change in the index of refraction of liquid 11 will disturb the symmetry of the waveshape of Figure 5 so that the crossing point 98 is moved toward the left or right depending upon the direction of change. This will disturb the symmetry of the waveshape which in turn will be detected by the symmetry discriminator circuit comprising triodes 80 and 81. This asymmetrical condition will then be indicated by the indicator 50. Exemplary asymmetrical waveshapes are shown in Figures 6 and 7.

The triodes 80 and 81, under these circumstances, will have voltages of asymmetrical waveshapes applied to their grids such as shown in Figures 6 and 7, respectively.

These asymmetrical signals are opposite in phase being derived from the phase inversion circuit. In Figures 6 and 7 the crossing point 98, corresponding to the critical angle, has been illustratively shown displaced toward the left. This occurs when the critical angle is reached earlier in the scanning cycle and will be the case if the index of refraction of the liquid has increased above its nominal value.

The triodes 80 and 81 are arranged to operate as positive peak voltage voltmeter circuits. As a result, when the crossing point 98 is displaced toward the left as shown in Figures 6 and 7, the voltage half-wave 100 in the negative direction of Figure 6 is shortened in time and increased in peak amplitude while the positive half-wave 101 is extended in time and decreased in peak amplitude, with respect to the average line 102. The opposite situation prevails in Figure 7 which represents the asymmetrical waveshape of opposite phase applied to grid 87 of triode 81. As a result, the normal condition of balance is disturbed and the voltage across cathode resistor 89 of triode 81 will increase while the voltage across cathode resistor 88 of triode 80 will decrease. This voltage difference will be indicated on indicator 50 and may also be used for control purposes, if desired. Further, the discriminator circuit may be effectively utilized in connection with supplementary apparatus such as temperature measuring devices, pH meters and the like to compensate for one or more factors which would change the nominal value of the index of refraction. It is apparent that any such measurement may be converted into a direct current potential which may be introduced in series with one of the grid resistors 90 or 91, for example, so as to shift the balance point of the symmetry discriminator 80—81.

As is well understood, the term "symmetrical" as applied to the waveshapes (Figures 5 to 7), and to the symmetry discriminator described above, means that the peak value of the waves, above and below the average, is the same for either polarity. In other words, the signal in Figure 5, being symmetrical, has the same peak values for both positive and negative excursions so that the twin peak detector triodes 80 and 81 would both have the same response and the voltages to ground across the capacitor shunted resistors 88 and 89, respectively, would be of the same value and the zero center indicator meter 50 will show null.

Since any variation in the index of refraction is detected by a deviation of a waveshape from a condition of symmetry, rather than by a precise angular measurement it is not essential that the slope of the wave through the crossing point 98 be infinite which would be the case if the optical and electrical systems were ideally perfect. The system will detect a change from symmetry even if the critical angle is not sharply defined as may be seen from the waveshape diagrams of Figures 5 to 7. This permits various minor optical defects to be present in the system without impairing its overall accuracy of measurement or reducing its sensitivity. The use of monochromatic light is not required to avoid chromatic aberrations.

The revolving prism 27 may provide an extremely high scanning speed without encountering mechanical difficulties. If driven by a small two-pole synchronous motor from a 60 cycle line at 3600 R. P. M. the scanning frequency for the octagonal prism shown will be 480 cycles per second.

It will further be understood that by means of an optical coupling film having a suitable index of refraction, the prism may be used with solid substances. The substance being measured may also be opaque, provided that it produces a change from total to partial reflection at the critical angle for the prism interface, as is well known in the art.

While I have described what I believe to be the best embodiments of my invention, it will be apparent to those skilled in the art that many changes and modifications may be made therein without departing from the spirit

What is claimed is:

1. In a refractometer for measuring the index of refraction of a medium, the combination of a refracting member having a light-reflecting surface adapted to be disposed in contact with said medium, cyclically operative scanning means for directing a beam of light through said refracting member for reflection from said surface, said beam being directed toward said surface at a continuously varying angle which varies through a range comprising the critical angle of incidence of said refracting member with respect to said medium when in contact therewith, light responsive means disposed in the path of light reflected from said surface, and rate of change responsive means connected to said light responsive means, said rate of change responsive means comprising means for producing a measurement effect in accordance with the particular position within each scanning cycle that an abrupt change in the intensity of said reflected light occurs as said scanning means causes said angle to vary through said critical angle, whereby said measurement effect is independent of the average intensity of said reflected light.

2. The combination according to claim 1, further comprising a vessel, said medium being a fluid confined within said vessel, and wherein said refractive member is mounted in a wall portion of said vessel and adapted to be in direct contact with said fluid.

3. In a refractometer for measuring the index of refraction of a medium, the combination of a refracting member having a light-reflecting surface adapted to be disposed in contact with said medium, cyclically operative scanning means for directing a beam of light through said refracting member for reflection from said surface, said beam being directed toward said surface at a continuously varying angle which varies through a range comprising the critical angle of incidence of said refracting member with respect to said medium when in contact therewith, said range of variation being symmertrical with respect to a predetermined value of said critical angle which corresponds to a predetermined nominal value of the index of refraction of said medium, whereby the intensity of said reflected light has a waveshape which is symmetrical for said nominal value, and light responsive means disposed in the path of light reflected from said surface, said light responsive means including symmetry discriminating means responsive to a deviation of said waveshape from said condition of symmetry.

4. In a refractometer for measuring the index of refraction of a light refractive medium, the combination of a light-refracting member having a transparent face adapted to be disposed in effective refractive contact with said medium, said refracting member being formed of a material having an index of refraction greater than that of said medium, cyclically operative scanning means which directs a beam of light through said member and against said transparent face angularly for reflection therefrom, said scanning means causing said beam to be directed against said face at a varying angle which sweeps repeatedly through a range of values which includes the critical angle of incidence of said refracting member with respect to said medium when in contact therewith, an abrupt change between the total and partial reflection from said face occurring as said beam sweeps through said critical angle, and phase sensitive light responsive means disposed in the path of the beam reflected from said face, said light responsive means being effectively insensitive to the average light intensity of said reflected beam and responsive to the particular instant within each individual cycle of operation of said scanning means at which said abrupt change occurs.

5. The combination according to claim 4, wherein said transparent face is plane.

6. In a refractometer for measuring the index of refraction of a light refractive medium, the combination of a light-refracting member having a plane transparent face adapted to be disposed in effective refractive contact with said medium, said refracting member being formed of a material having an index of refraction greater than that of said medium, cyclically operative scanning means which directs a beam of light through said member and against said transparent face angularly for reflection therefrom, said scanning means causing the angle at which said beam of light is directed against said plane face to vary angularly through a predetermined range, adjusting means for adjusting said scanning means so that the critical angle of incidence of said refracting member with respect to said medium lies at the midpoint of said angular range, and light responsive measuring means disposed in the path of light reflected from said face, said light responsive means comprising symmetry discriminating means responsive to any deviation of a periodic change in the intensity of said reflected light from the midpoint of any scanning cycle.

7. In a refractometer for the substantially continuous measurement of the index of refraction of a medium of varying index of refraction, the combination of a light source, a continuously revolving prism having an even number of opposed plane parallel faces, means for directing a light beam derived from said source toward successive ones of said prism faces for producing a laterally moving light beam which is continuously parallel to said beam derived from said light source, lens means traversed by said moving light beam and focusing said beam at a predetermined position throughout its lateral movement, whereby said beam reaches said position at a cyclically and continuously varying angle, means defining a light reflecting interface adapted for refractive contact with said medium and disposed in the path of said beam of varying angle, the range of variation of said varying angle including the critical angle of incidence of said last named means with respect to said medium when in contact therewith whereby there is a transition between total and partial reflection at said interface as said varying angle passes through said critical angle and light responsive measurement means disposed in the path of the light reflected from said interface for determining said index of refraction.

8. A refractometer according to claim 7, further comprising means for forming said light beam derived from said source into a thin ribbon-like configuration said ribbon-like beam being directed toward the rotational axis of said revolving prism with the width thereof extending in the direction of said axis.

9. A refractometer according to claim 7 wherein said means defining said interface comprises a measurement prism having a transparent plane face defining said interface, said measurement prism having a reflecting face upon which said moving light beam is directed by said lens means and which reflects said moving beam towards said interface at a cyclically varying angle.

10. A refractometer according to claim 9 in which said light responsive measurement means further comprises symmetry discriminating means responsive to any deviation from symmetry in the time-base waveshape of the intensity of the light reflected from said interface, said range of variation of said varying angle being symmetrical with respect to said critical angle for a predetermined value of said index of refraction.

11. In a refractometer for the substantially continuous measurement of the index of refraction of a medium of varying index of refraction, the combination of a light source, a continuously revolving prism having an even number of opposed plane parallel faces, means for directing a light beam derived from said source toward successive ones of said prism faces for producing a laterally moving light beam which is continuously parallel to said beam derived from said light source, lens means traversed by said moving light beam and focusing said beam at a predetermined position throughout its lateral movement, whereby said beam reaches said position at a cyclically and continuously varying angle which varies through a predetermined angular range, a measurement prism having a transparent plane interface adapted to be placed in effective refractive contact with said medium, said measurement prism having a reflecting face upon which said moving light beam is directed by said lens means and which reflects said moving beam toward said interface at a cyclically varying angle, and light responsive means including symmetry discriminating means disposed in the path of light reflected from said interface, the critical angle of incidence of said measurement prism with respect to said medium being located at the midpoint of said angular range for a predetermined index of refraction of said medium, said symmetry discriminating means being responsive to any deviation from the midpoint of any scanning cycle of the periodic change in the intensity of the light reflected from said interface which occurs at said critical angle.

12. A refractometer according to claim 11, and in which said light responsive means further comprises photoelectric means for deriving a signal from the light reflected from said interface, and circuit means for deriving a pair of signals of opposite phase from said first-named signal, said symmetry discriminating means comprising a pair of normally balanced peak voltage responsive devices to which the two signals of said pair are respectively applied, and means connected to said peak voltage devices and responsive to an unbalance therebetween.

13. A refractometer according to claim 11 further comprising adjustable means for varying said angular range, said adjustable means comprising angularly adjustable mounting means by which said revolving prism and said lens means are supported.

References Cited in the file of this patent

UNITED STATES PATENTS

| | | |
|---|---|---|
| 1,939,088 | Styer | Dec. 12, 1933 |
| 2,133,106 | Monroe | Oct. 11, 1938 |
| 2,278,781 | Harrison | Apr. 7, 1942 |
| 2,388,727 | Dench | Nov. 13, 1945 |
| 2,529,030 | Latchum | Nov. 7, 1950 |
| 2,548,154 | Gosswiller | Apr. 10, 1951 |
| 2,768,553 | Goldberg et al. | Oct. 30, 1956 |

FOREIGN PATENTS

| | | |
|---|---|---|
| 690,268 | Great Britain | Apr. 15, 1953 |

OTHER REFERENCES

Karrer and Orr article in Journal of Optical Society of America, "A photoelectric refractometer," volume 36, January 1946, pages 42–46.